United States Patent [19]

Coran

[11] 4,123,411

[45] Oct. 31, 1978

[54] PLASTICIZED COMPOSITION OF COPOLYETHERESTER ELASTOMER AND AROMATIC SULFONAMIDE

[75] Inventor: Aubert Y. Coran, Akron, Ohio

[73] Assignee: Monsanto Company, St. Louis, Mo.

[21] Appl. No.: 796,235

[22] Filed: May 12, 1977

[51] Int. Cl.$^2$ .................. C08G 63/12; C08K 5/04; C08K 5/41; C08K 5/16

[52] U.S. Cl. ................................ 260/30.8 R; 528/301

[58] Field of Search ..................... 260/30.8 R, 75 R

[56] References Cited

U.S. PATENT DOCUMENTS

| | | | |
|---|---|---|---|
| 2,276,437 | 3/1942 | Vaala | 260/30.8 R |
| 2,865,891 | 12/1958 | Michel | 260/75 R |
| 3,023,192 | 2/1962 | Shivers | 260/75 R |
| 3,639,505 | 1/1972 | Hughes et al. | 260/873 |
| 3,651,014 | 3/1972 | Witsiepe | 260/75 R |
| 3,766,146 | 10/1973 | Witsiepe | 260/75 R |
| 3,775,373 | 11/1973 | Wolfe | 260/75 R |
| 3,775,374 | 11/1973 | Wolfe | 260/75 R |
| 3,784,520 | 1/1974 | Hoeschele | 260/75 R |
| 3,891,604 | 6/1975 | Wolfe | 260/75 R |

OTHER PUBLICATIONS

Hytrel Polyester Elastomer VII-11 to VII-12.

*Primary Examiner*—Herbert J. Lilling
*Attorney, Agent, or Firm*—Larry R. Swaney

[57] ABSTRACT

Compositions are described comprising segmented thermoplastic copolyetherester elastomers plasticized with aromatic sulfonamides containing at least two aliphatic carbon atoms.

11 Claims, No Drawings

PLASTICIZED COMPOSITION OF COPOLYETHERESTER ELASTOMER AND AROMATIC SULFONAMIDE

This invention relates to segmented thermoplastic copolyetherester elastomers generally found in U.S. Pat. class 260, subclass 75, and, more particularly to plasticized compositions containing said elastomers and certain sulfonamides.

BACKGROUND OF THE INVENTION

Plasticizers are incorporated into polymers to improve properties, such as, enhanced processibility and increased pliability at low temperature. Practicable plasticizers exhibit certain critical characteristics including chemical inertness toward the polymer, low volatility at the polymer fusion temperature, compatibility with the polymer the lack of which leads to exudation of the plasticizer and depending upon the intended use other characteristics such as light stability and solvent resistance. Thermoplastic copolyetherester elastomers exhibit such limited compatbility toward phthalate plasticizers that in order to incorporate significant amounts of plasticizer, the addition of a more compatible polymer such as vinyl chloride polymer is used. Moreover, because of the high melting point of certain copolyetherester elastomers, the incorporation of plasticizers and vinyl chloride polymer is difficult because processing temperatures can exceed the decomposition temperature of the vinyl polymer. Further, at high processing temperature ester containing plasticizers tend to intercharge with the ester groups of the elastomers. Sulfonamide plasticizers are considered unsatisfactory for polyesters because of incompatibility when the amount of plasticizer exceeds 10 parts plasticizer or more per 100 parts polyester. Accordingly, it was unexpected to find that co-polyetherester elastomers are compatible with certain sulfonamides at high concentrations.

SUMMARY OF THE INVENTION

Compositions of the invention comprise thermoplastic copolyetherester elastomer as hereafter defined, and, in an amount effective to plasticize the composition, a normally liquid sulfonamide of the formula

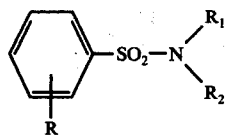

in which R and $R_1$ are hydrogen or alkyl of 1-6 carbon atoms, $R_2$ is alkyl of 1-12 carbon atoms and R, $R_1$ and $R_2$ contain a total of at least 2 carbon atoms. Plasticized compositions of the invention containing sulfonamides in which R, $R_1$ and $R_2$ contain a total of 4-12 carbon atoms exhibit an improved balance of proprties including higher compatibility, lower glass transition temperatures and high temperature hysteresis. Compositions containing sulfonamides in which $R_1$ and $R_2$ are different alkyl radicals exhibit greater compatibility than sulfonamides in which $R_1$ and $R_2$ are the same. Compositions containing sulfonamides in which R and $R_1$ are hydrogen exhibit better hysteresis at elevated temperatures. Suitable sulfonamide plasticizers of the invention are "normally liquid", i.e., they are stable liquids at room temperature. Solid sulfonamides are unsuitable because they are inherently incompatible leading to excessive blooming from the composition. However, any sulfonamide having a melting point sufficiently near room temperature may be used provided it is blended with sulfonamide of lower melting point to give a normally liquid sulfonamide mixture.

The amount of sulfonamide plasticizer incorporated into the copolyetherester elastomer depends upon the properties desired in the plasticized composition. Quantities of about one to two parts of plasticizer per 100 parts elastomer are sufficient to reduce hardness and the glass transition temperature with both properties progressively decreasing with increasing amounts of plasticizer. The maximum quantity of plasticizer varies depending upon the sulfonamide and elastomer and is reached when excess plasticizer exudes from the elastomer. Generally, satisfactory quantities of plasticizer are from about 2-50 weight percent plasticizer per total weight sulfonamide and elastomer. The copolyetherester elastomer of this invention is distinct from polyesters in its ability to accommodate high levels (more than 10 parts per 100 parts elastomer) of sulfonamide plasticizer. Especially preferred compositions contain between 10-40 weight percent plasticizer per total weight sulfonamide and elastomer.

The plasticizer may be incorporated into the elastomer by any conventional method for incorporating plasticizers into polymers which methods involve masticating and heating the polymer using standard equipment such as heated mills or internal mixers such as Banbury mixers or twin screw extruders.

The sulfonamide plasticizers of the invention belong to a class of known sulfonamide compounds, all of which may be prepared by known procedures. One synthesis route comprises reacting benzene- or alkylsubstituted benzene sulfonyl chloride with a mono- or dialkylamine. Another synthesis route comprises reacting N-alkyl-arenesulfonamide with haloalkane to give N,N-dialkylarenesulfonamide. Any liquid sulfonamide having a Hildebrand solubility parameter between 9 and 11 is suitable but those sulfonamides having a solubility parameter between 9.7-10.7 exhibit greater compatibility and are preferred. The solubility parameters of sulfonamide plasticizers of the invention are calculated from structural formula and estimated molecular volumes by the method published by P. A. Small, *J. App. Chem.*, 3, p. 71(1953). Examples of satisfactory sulfonamide plasticizers are N-isopropyl benzene sulfonamide, N-tert-butyl benzene sulfonamide, N-pentyl benzene sulfonamide, N-hexyl benzene sulfonamide, N-n-octyl benzene sulfonamide, N-methyl-N-butyl benzene sulfonamide, N-methyl-N-ethyl benzene sulfonamide, N-methyl-N-propyl benzene sulfonamide, N-ethyl-N-propyl benzene sulfonamide, N-ethyl p-ethylbenzene sulfonamide, N-ethyl p(t-butyl)benzene sulfonamide, N-butyl p-butyl benzene sulfonamide, N-butyl (mixed) toluene sulfonamide (mixed meaning a mixture of the ortho and para isomers of toluene), N-t-octyl (mixed) toluene sulfonamide, N-ethyl-N-2-ethylhexyl (mixed) toluene sulfonamide and N-ethyl-N-t-octyl (mixed) toluene sulfonamide.

Thermoplastic copolyetherester elastomers which are suitable in the practice of the invention are defined below. The term "thermoplastic copolyetherester elastomer" as used herein and the claims means a segmented polymer consisting essentially of about 30% to about 80% by weight recurring linear etherester (soft) segments derived from difunctional polyether glycol and dicarboxylic acid and about 70% to about 20% by weight recurring linear ester (hard) segments derived from organic diol and aromatic dicarboxylic acid. Polyether glycols having a molecular weight from about 350 to about 6000 are suitable with polyether glycols having a molecular weight between about 1000 to 4000 being preferred. The aromatic ester hard segment represents a repeating unit of a fiber-forming polyester having a melting point above 150° C, preferably, above 200° in its fiber-forming molecular weight range, for example, polyethyleneterephthalate and polytetramethyleneterephthalate. For further details on the preparation, composition and properties of satisfactory segmented thermoplastic copolyetherester elastomers, see U.S. Pat. Nos. 3,023,192; 3,651,014; 3,766,146; 3,775,373; 3,784,520 and 3,891,604, all assigned to E. I. du Pont de Nemours and Company, the disclosures of which are hereby incorporated by reference. Suitable segmented thermoplastic copolyetherester elastomers derived from terephthalic acid, polytetramethylene ether glycol and 1,4-butanediol may be purchased from du Pont under the trademark Hytrel elastomer. Three grades are available designated 92A, 55D and 63D which indicates a shore A hardness of 92 (equivalent to shore D hardness of 40), a shore D hardness of 55 and a shore D hardness of 63, respectively. The grades 92A, 55D and 63D contain about 33, 58 and 76 weight percent of aromatic polyester hard segment, respectively.

The plasticized compositions of the invention are characterized by conventional test procedures. The stress-strain properties of the compositions are determined in accordance with the test procedures set forth in ASTM D638 and ASTM D1566. Dynamic shear modulus G' is measured as a function of specimen temperature using a torsion pendulum from which data hysteresis, Tan δ and $T_f$, the temperature below which G' is over 45000 psi (3164 Kg./cm²). The temperature $T_f$ is similar to the glass transition temperature $T_g$.

DESCRIPTION OF PREFERRED EMBODIMENTS

Plasticized compositions of the invention are prepared by mixing thermoplastic copolyetherester elastomer and sulfonamide plasticizer in a Brabender mixer at a mixing speed of 100–120 rpm at 215°–220° C. The elastomer is charged to the mixer and masticated until melted. The plasticizer is then added and the mixture is masticated for 3–5 minutes until a homogenous blend is obtained. Specimens are prepared in sheet form by compression molding for 3–5 minutes at 225°–230° C and cooling below 100° C before removal from the mold. Properties of the specimens are evaluated as described above.

Plasticized compositions of the invention consisting of copolyetherester elastomer (Hytrel elastomer, shore D hardness 63) and 10 and 20 weight percent sulfonamide plasticizers are shown in Table I. Stock 1 is a control containing no plasticizer. Stocks 2–9 illustrate compositions of the invention containing normally liquid sulfonamides. The data show that the addition of plasticizer significantly reduces the glass transition temperature and hardness as indicated by the reduction in modulus. The data also show a substantial reduction in hysteresis at room temperature and retention of low hysteresis at elevated temperatures which property is important in dynamic applications where a part is flexed during use such as in belts or tires. Stock 6 indicates that compatibility is reduced when the total number of alkyl carbon atoms exceeds 12. Comparison of Stock 2 with Stock 8 containing a commercially available sulfonamide plasticizer (Santicizer 8) indicates that the reduction in glass transition temperature is greater when the total number of alkyl carbon atoms is four or more.

Compositions of three types of copolyetherester elastomer (Hytrel, each of different hardness) plasticized with N-ethyl (mixed) toluene sulfonamide are shown in Table II. The compatibility of all compositions is excellent including the composition containing 40 weight percent plasticizer. The data indicate that compositions exhibiting a broad spectrum of properties can be achieved by addition of plasticizer. Young's modulus and shear modulus can be reduced by a factor of two or more by incorporation of plasticizer.

An important advantage of the use of sulfonamide plasticizer is illustrated in Table III. The properties of unplasticized copolyetherester elastomer (Hytrel type 92A) is compared with the properties of plasticized copolyetherester elastomer of higher hardness (Hytrel type 55D) containing 30 weight percent N-ethyl (mixed) toluene sulfonamide. The data show that hysteresis, shear modulus, Young's modulus and glass transition temperatures are about the same but that the melting point and recrystallization temperature of the plasticized composition are higher. Higher melting point indicates that the plasticized composition can be used at higher service temperatures while the higher crystallization temperature indicates that shorter molding cycles are required for the plasticized composition.

TABLE I

| Stock No. | Plasticizer | Solubility Parameter,a δ | Plasticizer Level, Wt. % | Compatibility Ratingb | Glass Trans. Temp.c Tf, °C | 100 × Tanδ at °C | | | | | | Shear Modulus, G' Kg./cm² at °C | | | | | | Tensile Str. at Break, Kg./cm² | 100% Modulus, Kg./cm² | Young's Mod., Kg./cm² | Elongation at Break, % |
|---|---|---|---|---|---|---|---|---|---|---|---|---|---|---|---|---|---|---|---|---|---|
| | | | | | | 25 | 70 | 80 | 90 | 100 | 110 | 25 | 70 | 80 | 90 | 100 | 110 | | | | |
| 1 | None | | 0 | — | +1.5d | 10.0 | 3.40 | 3.31 | 3.24 | 3.12 | 3.20 | 1230 | 571 | 510 | 474 | 425 | 374 | 423 | 204 | 2341 | 570 |
| 2 | 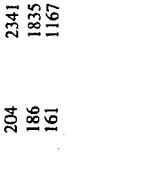 N-n-butyl benzene sulfonamide | 10.41 | 10 | 7 | −23.6 | 5.1 | 3.49 | 4.00 | 3.80 | 3.66 | 3.56 | 3.56 | 752 | 528 | 432 | 432 | 387 | 354 | 186 | 1835 | 610 |
| | | | 20 | | −33.3 | 6.1 | 4.35 | 3.90 | 3.98 | 3.83 | 3.83 | 3.60 | 443 | 320 | 307 | 263 | 228 | 281 | 161 | 1167 | 600 |
| 3 | 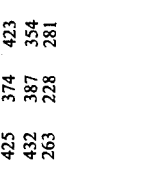 N-t-octyl benzene sulfonamide | 9.86 | 10 | 7 | −21.8 | 5.8 | 3.99 | 4.15 | 3.90 | 3.83 | 3.66 | 689 | 596 | 501 | 501 | 452 | 427 | 367 | 180 | 1758 | 639 |
| | | | 20 | | −34.3 | 5.6 | 4.65 | 4.31 | 3.85 | 4.10 | 3.70 | 527 | 343 | 320 | 307 | 263 | 228 | 270 | 156 | 1857 | 560 |
| 4 | 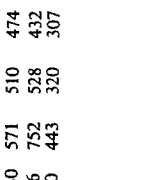 N-2-ethylhexylbenzene sulfonamide | 9.76 | 10 | 7 | −22.3 | 5.60 | 4.63 | 4.50 | 4.15 | 3.80 | 3.52 | 717 | 544 | 514 | 468 | 410 | 373 | 393 | 179 | 1877 | 620 |
| | | | 20 | | −28.6 | 5.20 | 5.10 | 5.58 | 4.80 | 4.37 | 4.72 | 591 | 447 | 404 | 350 | 323 | 295 | 304 | 163 | 1904 | 590 |
| 5 | 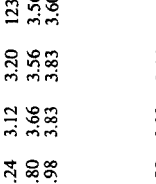 N-ethyl,N-butyl benzene sulfonamide | 10.05 | 10 | 7 | −26.0 | 5.40 | 3.73 | 3.73 | 4.60 | 3.60 | 3.48 | 724 | 498 | 461 | 461 | 399 | 335 | 399 | 177 | 1624 | 650 |
| | | | 20 | | −38.1 | 4.60 | 5.45 | 5.45 | 4.80 | 5.30 | 5.37 | 513 | 416 | 380 | 349 | 314 | 292 | 307 | 157 | 1223 | 610 |
| 6 | 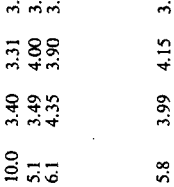 N-ethyl,N-lauryl (mixed) toluene sulfonamide | 9.36 | 10 | 4 | −234.2 | 6.70 | 5.05 | 4.90 | 4.60 | 4.41 | 4.20 | 823 | 575 | 534 | 461 | 437 | 403 | 362 | 191 | 1870 | 550 |
| | | | 20 | | −36.2 | 6.40 | 5.05 | 4.70 | 4.60 | 4.60 | 4.80 | 548 | 401 | 361 | 330 | 301 | 271 | 260 | 159 | 1251 | 530 |
| 7 | 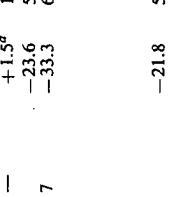 N-ethyl-N-hexyl (mixed) toluene sulfonamide | 9.74 | 10 | 7 | −23.0 | 6.10 | 4.20 | 4.04 | 4.30 | 3.69 | 3.55 | 738 | 545 | 507 | 472 | 427 | 387 | 408 | 184 | 1807 | 640 |
| | | | 20 | | −34.8 | 5.20 | 4.50 | 4.20 | 4.04 | 4.20 | 3.67 | 584 | 384 | 356 | 326 | 300 | 275 | 327 | 162 | 1202 | 620 |

TABLE I-continued

| Stock No. | Plasticizer | Solubility Parameter[a], δ | Plasticizer Level, Wt. % | Compatibility Rating[b] | Glass Trans. Temp.[c] Tf, °C | 100 × Tanδ at °C | | | | | | Shear Modulus, G' Kg./cm² at °C | | | | | | Tensile Str. at Break, Kg./cm² | 100% Modulus, Kg./cm² | Young's Mod., Kg./cm² | Elongation at Break, % |
|---|---|---|---|---|---|---|---|---|---|---|---|---|---|---|---|---|---|---|---|---|---|
| | | | | | | 25 | 70 | 80 | 90 | 100 | 110 | 25 | 70 | 80 | 90 | 100 | 110 | | | | |
| 8 | CH₃—⌬—SO₂—NH—C₂H₅ N-ethyl (mixed) toluene sulfonamide | 10.71 | 10 | 7 | −18.9 | 5.40 | 3.44 | 3.58 | 3.68 | 3.70 | 3.79 | 766 | 549 | 515 | 465 | 448 | 379 | 3658 | 178 | 1728 | 600 |
| | | | 20 | | −24.5 | 4.30 | 4.80 | 4.90 | 5.84 | 5.20 | 5.20 | 605 | 379 | 350 | 324 | 285 | 259 | 207 | 157 | 1301 | 370 |
| 9 | CH₃—⌬—SO₂—N(C₂H₅)(C₄H₉) N-ethyl,N-butyl (mixed) toluene sulfonamide | 9.94 | 10 | 7 | −24.4 | 5.60 | 3.45 | 3.88 | 3.99 | 4.00 | 3.88 | 745 | 531 | 469 | 450 | 411 | 373 | 410 | 188 | 1800 | 630 |
| | | | 20 | | −38.3 | 5.10 | 4.57 | 4.63 | 4.28 | 4.59 | 4.72 | 485 | 354 | 323 | 286 | 266 | 249 | 308 | 162 | 1244 | 600 |

[a]Calculated values;
[b]B Bloomed: 0 Heavy exudation at 10 wt. %; 1 Light exudation at 10 wt. %; 2 Very light exudation at 10 wt. %; 3 are for compatible at 10 wt. % but 3 very heavy exudation at 20 wt. %; 4 heavy exudation at 20 wt. %; 5 - Moderate exudation at 20 wt. %; 6 Light exudation at 20 wt. %; 7 Compatible at 10 and 20 wt. % plasticizer level.
[c]Temperature at which G' is 45Kpsi.
[d]Tg = 2° C

TABLE II

| Elastomer Type | Plasticizer wt. % | Tens. Str. at Brk. Kg./cm² | Modulus, Kg./cm² 100% | Modulus, Kg./cm² Young's, E | Elong. at Break % | 100 × Tanδ at °C | | | | | | Shear Modulus G', Kg./cm² at °C | | | | | |
|---|---|---|---|---|---|---|---|---|---|---|---|---|---|---|---|---|---|
| | | | | | | 25 | 70 | 80 | 90 | 100 | 110 | 25 | 70 | 80 | 90 | 100 | 110 |
| 92A | 0 | 297 | — | 429 | 980 | 3.9 | 3.60 | 2.74 | 4.45 | 3.89 | 3.89 | 202 | 125 | 114 | 104 | 98 | 79 |
| | 10 | 277 | 66 | 304 | 1020 | 3.3 | 3.40 | 3.70 | 4.00 | 4.20 | 4.83 | 167 | 84 | 75 | 69 | 58 | 52 |
| | 20 | 247 | 54 | 223 | 1130 | | | | | | | | | | | | |
| 55D | 0 | 426 | 155 | 1586 | 740 | 3.3 | 2.70 | 2.80 | 2.80 | 3.09 | 2.85 | 787 | 538 | 478 | 454 | 422 | 393 |
| | 10 | 364 | 151 | 1116 | 760 | 3.6 | 3.39 | 3.43 | 3.35 | 3.66 | 3.73 | 555 | 370 | 340 | 301 | 293 | 254 |
| | 20 | 290 | 134 | 818 | 740 | 4.6 | 3.73 | 3.95 | 3.99 | 4.03 | 3.79 | 367 | 252 | 220 | 218 | 198 | 179 |
| | 30 | 162 | 108 | 499 | 510 | 4.0 | 4.20 | 4.05 | 4.40 | 4.05 | 4.00 | 232 | 158 | 145 | 135 | 126 | 114 |
| | 40 | 95 | 86 | 365 | 200 | 4.4 | 9.80 | 6.30 | 4.45 | 4.45 | 3.60 | 225 | 107 | 103 | 89 | 83 | 73 |
| 63D | 0 | 380 | 205 | 2697 | 600 | 10.0 | 3.65 | 3.30 | 3.19 | 3.10 | 3.17 | 1230 | 771 | 747 | 659 | 648 | 597 |
| | 5 | 358 | 185 | 2149 | 580 | — | 3.57 | 3.40 | 3.49 | 3.49 | 3.60 | — | 694 | 632 | 589 | 528 | 499 |
| | 10 | 350 | 188 | 1765 | 610 | 5.2 | 3.49 | 3.49 | 3.70 | 3.90 | 4.00 | 769 | 536 | 473 | 464 | 421 | 391 |
| | 20 | 282 | 159 | 1273 | 570 | 4.8 | 3.70 | 4.70 | 5.05 | 5.25 | 4.90 | 555 | 419 | 376 | 334 | 307 | 281 |

TABLE III

| Properties | Elastomer, type 92A | Elastomer, type 55D + wt % plasticizer |
|---|---|---|
| tan δ | 0.039 | 0.040 |
| G; kg./cm² | 202 | 232 |
| E, kg./cm² | 429 | 499 |
| Tf, °C | −51 | −45 |
| Tm, °C (peak) | 150 | 178 |
| Tx, °C (peak) | 50 | 130 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A plasticized composition comprising thermoplastic copolyetherester elastomer consisting essentially of recurring linear etherester and ester segments wherein the etherester segments are derived from difunctional polyether glycol and dicarboxylic acid, and the ester segments are derived from organic diol and aromatic dicarboxylic acid and, in an amount from 10 parts per 100 parts polyester segment up to an amount which exudes from the composition, a normally liquid sulfonamide of the formula

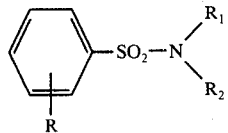

in which R and $R_1$ are hydrogen or alkyl of 1–6 carbon atoms, $R_2$ is alkyl of 1–12 carbon atoms and R, $R_1$ and $R_2$ contain a total of at least 2 carbon atoms.

2. The composition of claim 1 in which R, $R_1$ and $R_2$ contain a total of 4–12 carbon atoms.

3. The composition of claim 2 in which $R_1$ is alkyl.

4. The composition of claim 3 in which $R_1$ and $R_2$ are different.

5. The composition of claim 2 in which R is hydrogen.

6. The composition of claim 5 in which $R_1$ is hydrogen.

7. The composition of claim 1 containing up to 50 weight percent sulfonamide per total weight sulfonamide and elastomer.

8. The composition of claim 1 containing 10–40 weight percent sulfonamide per total weight sulfonamide and elastomer.

9. The composition of claim 1 in which the copolyetherester elastomer consists essentially of recurring linear etherester and ester segments wherein the etherester segments are derived from difunctional polyether glycol having a molecular weight between about 1000 to 4000 and dicarboxylic acid, and the ester segments are derived from organic diol and aromatic dicarboxylic acid and represents a repeating unit of a fiber-forming polyester having a melting point above 200° C in its fiber-forming molecular weight range.

10. The composition of claim 9 in which the copolyetherester elastomer contains about 30% to about 80% by weight etherester segments and about 70% to about 20% by weight ester segments.

11. The composition of claim 10 in which the copolyetherester elastomer is derived from terephthalic acid, polytetramethylene ether glycol and 1,4-butanediol.

* * * * *

UNITED STATES PATENT OFFICE
CERTIFICATE OF CORRECTION

PATENT NO. : 4,123,411

DATED : October 31, 1978

INVENTOR(S) : A. Y. Coran

It is certified that error appears in the above-identified patent and that said Letters Patent are hereby corrected as shown below:

Column 1, line 59 [proprties] should read "properties".

In Table I:

In Stock 2, the first [N] in the formula should be "S" so that it reads "-$SO_2$-".

In Stock 2, at the 10 wt. % plasticizer level, the Shear Modulus at 25°C should read "752" instead of [3.56] and at 70°C should read "528" instead of [752].

In Stock 2, at the 20 wt. % plasticizer lever, Tan δ at 110°C should read "3.60" instead of [3.83]. The Shear Modulus at 25°C should read "443" instead of [3.60] and at 70°C should read "343" instead of [443].

In Stock 3, the [7] in the formula should be "8" so that it reads "-$C_8H_{17}$".

In Stock 3, at the 10 wt. % plasticizer level, the Elongation at break should read "630" instead of [639].

In Stock 3, at the 20 wt. % plasticizer level, Young's modulus should read "1357" instead of [1857].

In Stock 4, at the 20 wt. % plasticizer level, 100% modulus should read "162" instead of [163] and Young's modulus should read "1364" instead of [1904].

UNITED STATES PATENT OFFICE
CERTIFICATE OF CORRECTION

PATENT NO. : 4,123,411

DATED : October 31, 1978

INVENTOR(S) : A. Y. Coran

Page 2 of 2

It is certified that error appears in the above-identified patent and that said Letters Patent are hereby corrected as shown below:

In Stock 8, at the 10 wt. % plasticizer level, Tensile strength should read "368" instead of [3658] and Young's modulus should read "1828" instead of [1728].

In Table III, in the caption for the third column insert "30" between + and wt. so that it reads "+30 wt. %".

Signed and Sealed this

Fifteenth Day of May 1979

[SEAL]

Attest:

RUTH C. MASON
Attesting Officer

DONALD W. BANNER
Commissioner of Patents and Trademarks